Figure 1:
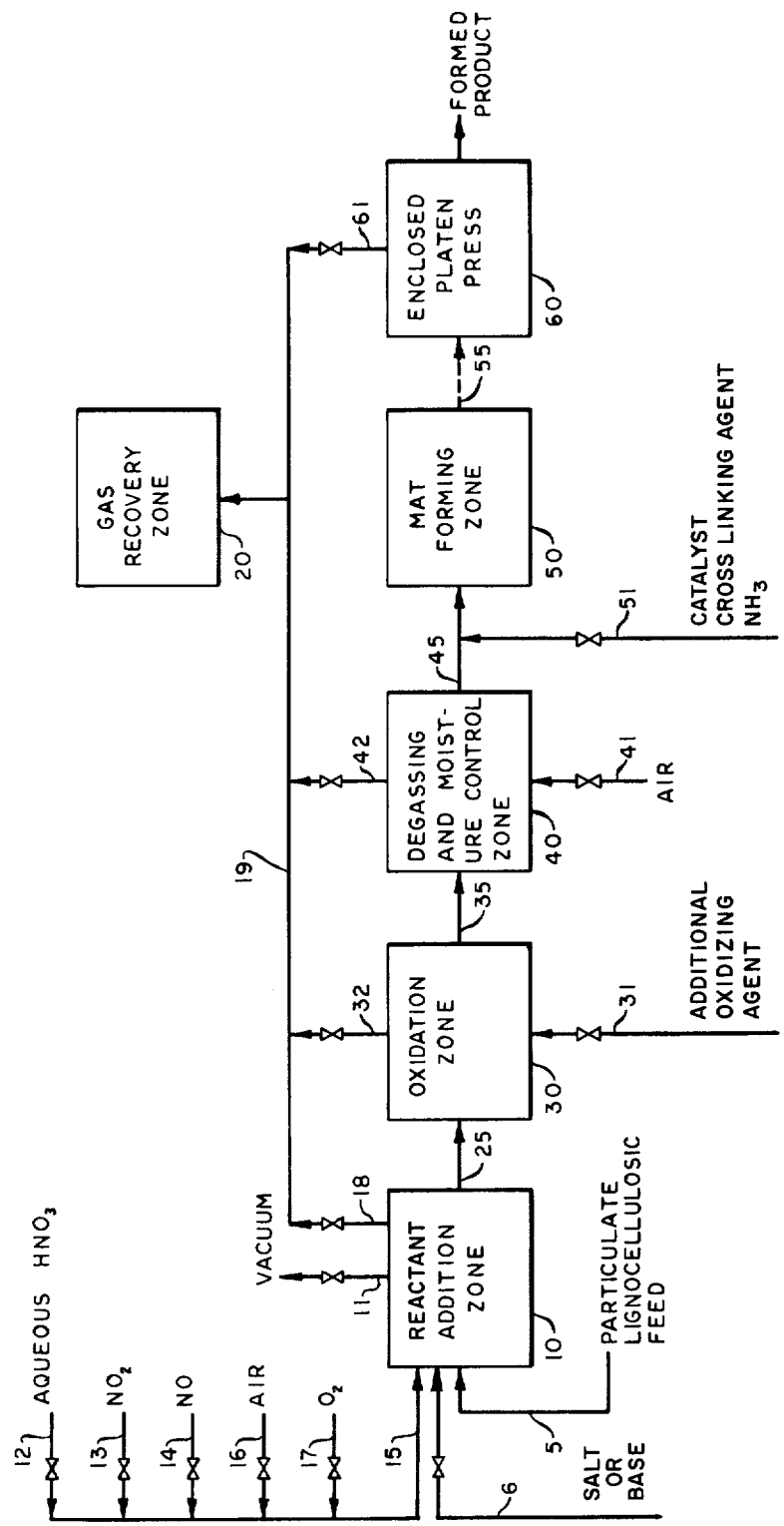

United States Patent [19]
Brink

[11] 3,900,334
[45] Aug. 19, 1975

[54] LIGNOCELLULOSIC MOLDING METHOD AND PRODUCT

[75] Inventor: David L. Brink, Berkeley, Calif.

[73] Assignee: The Regents of the University of California, Berkeley, Calif.

[22] Filed: Sept. 27, 1973

[21] Appl. No.: 401,444

Related U.S. Application Data

[63] Continuation-in-part of Ser. No. 133,688, April 13, 1971, abandoned.

[52] U.S. Cl. .............. 106/163; 260/212; 264/124
[51] Int. Cl. ................ C08b 23/00; C08b 27/24; C08b 27/52
[58] Field of Search ......... 106/163; 264/124; 162/9, 162/65; 260/212

[56] References Cited

UNITED STATES PATENTS

| | | | |
|---|---|---|---|
| 2,232,990 | 2/1941 | Yackel | 260/212 |
| 2,233,475 | 3/1941 | Dreyfus | 260/212 |
| 2,256,391 | 9/1941 | Hiatt | 260/212 |
| 2,730,524 | 1/1956 | Nieuwenhuis | 260/212 |
| 3,305,499 | 2/1967 | Bevans | 264/124 |

Primary Examiner—Theodore Morris
Attorney, Agent, or Firm—Stanley Bialos; Donovan J. DeWitt

[57] ABSTRACT

Particulate lignocellulosic materials containing water are subjected to oxidation with nitric acid, oxygen or with a mixture of oxygen and nitric acid under conditions adapted to form carboxylic groups, along with some carbonyl groups. As a result of this treatment the oxidized material becomes activated so as to undergo self-bonding when it is later molded under elevated conditions of temperature and pressure. This oxidation reaction proceeds at elevated temperatures until there has been a net consumption by the lignocellulose of about 1.25 to 25 weight percent of oxygen as supplied either as such and/or by way of nitric acid. These percentages are calculated on a dry lignocellulosic material basis. The oxidized product can then be pressed into the desired shape under elevated pressures and temperatures effective to induce esterification or other molecular cross-linking reactions between functional groups present in the lignocellulosic molecule or between such groups and those of other chemicals which are added, thus providing a molded structure. Board-shaped as well as other molded products of high strength and excellent resistance to moisture absorption can thus be obtained from a variety of lignocellulosic raw materials.

17 Claims, 3 Drawing Figures

LIGNOCELLULOSIC MOLDING METHOD AND PRODUCT

RELATED APPLICATION

This application is a continuation-in-part of copending application, Ser. No. 133,688, filed Apr. 13, 1971 now abandoned, by David L. Brink and entitled, "Lignocellulosic Molding Method and Product".

SUMMARY OF THE INVENTION

It has been discovered that molded lignocellulosic products having excellent strength and dimensional stability characteristics, including resistance to moisture, can be produced from essentially any particulate lignocellulosic material by the practice of a process which involves first the oxidative treatment of said material with nitric acid, oxygen or with nitric acid admixed with oxygen in which there is consumed from about 1.25 to 25 weight percent of oxygen supplied as such or by way of nitric acid or by nitric acid along with oxygen. This oxygen consumption is equivalent to a consumption of from about 2.5 to 50 weight percent nitric acid, i.e., twice the oxygen consumption. Preferably the nitric acid consumption is from about 2.5 to 30 weight percent. These percentages are based on the weight of the lignocellulosic material as measured on a dry (O.D.) basis. Among other reactions, this oxidation step is productive of carboxyl groups and some carbonyl groups in the lignocellulosic molecule.

This oxidation step is followed by one wherein the oxidized product is molded into the desired shape under moderately elevated temperatures and pressures adapted to effect crosslinking between functional groups contained in the material within the press or between said groups and those of other chemicals added to the oxidized product to be molded. This crosslinking gives the molded product good strength and dimensional stability characteristics. At the same time, the moisture content of the molded product is reduced to a low level. Representative crosslinking reactions which take place during molding are those of esterification between residual hydroxy groups and carboxy groups either as formed during oxidation or introduced by addition of maleic, terephthalic or other polybasic acids. Again, carboxyl groups present in the oxidized lignocellulosic material can be reacted (either as such or as first converted to ammonia salt or carbamyl groups) with added polyamine compounds such, for example, as hexamethylenediamine or phenylenediamine to form cross-linkages of the polyamide type. Both esterification as well as amidation reactions take place under the conditions of temperature and pressure used to effect the molding of the oxidized lignocellulosic materials formed in accordance with the present invention.

The lignocellulosic particulate materials employed in a practice of this invention can be selected from a wide variety of available products. Thus, for example, there can be employed wood chips or other small pieces of barked or unbarked wood, bark pieces, tree trimmings, wood shavings, sawdust, ground up brush, grasses, straws and various plant fibers including wheat and rice straw, cotton and corn stalks, bagasse and bamboo, and secondary fibers of any grade such as those derived from newspaper stock or from the classification of municipal solid wastes. The size of the lignocellulosic particles employed is not critical and may range, for example, from finely divided pulps and shredded materials to those having the size of wood ships as conentionally employed in wood pulping operations or wood flakes as used in particle board manufacture.

As noted above, the oxidation of the lignocellulosic material can be effected using either nitric oxide or oxygen, or using a mixture of nitric oxide and oxygen. For convenience of description, methods involving nitric acid, with or without oxygen, will now be described in greater detail.

A. OXIDATION WITH NITRIC ACID

The term "nitric acid", as employed herein, is intended to include preformed aqueous solutions of nitric acid as well as those aqueous solutions of nitric acid which are formed in situ within the moisture-containing lignocellulosic particles by the addition of gaseous oxides of nitrogen. These gases include nitrogen dioxide ($NO_2$ in equilibrium with $N_2O_4$) and nitric oxide (NO), and when employing either oxide the system must also be supplied at one stage or another with gaseous oxygen (or air) in at least the amount stoichiometrically required to convert nitric oxide (added as such or as formed as a product of reacting $NO_2$ and $H_2O$) to nitric acid, and preferably in excess of this amount by as much as 150 percent. Mixtures of nitrogen dioxide, nitric oxide, and oxygen can also be employed. Further, when using preformed nitric acid, oxygen may also be supplied to the lignocellulosic - $HNO_3$ system to reconvert nitric oxide formed during the process back to $NO_2$ and $HNO_3$ and thus greatly improve the efficiency of the process. The stoichiometry is such that ¾ mole of $O_2$ is required to convert each mole of NO to $HNO_3$. Water is the other reactant and is required in the amount of ½ mole for each mole of NO converted to $HNO_3$. When using preformed $HNO_3$, there are preferably employed from about 0.5 to 1.5 moles of oxygen per mole of $HNO_3$ in order to achieve the desired regenerative effect.

However the nitric acid is added to the lignocellulosic material, it is supplied thereto in an amount sufficient to provide for a net consumption by said material of from about 2.5 to 50 weight percent nitric acid (expressed as $HNO_3$), or of an equivalent amount of oxygen (1.25 to 25 weight percent) under the reaction conditions employed during the oxidation step, these percentages being calculated on an O.D. lignocellulosic basis.

The concentration of the aqueous $HNO_3$ present on the lignocellulosic material, as distinguished from the weight percent $HNO_3$ present, is not critical, and good results can be obtained with aqueous solutions containing from about 5 to 92 percent of $HNO_3$. Preferably the $HNO_3$ concentration is from about 20 to 65 percent. In this connection, it should be noted that green lignocellulosic materials normally have a moisture content from about 50 to 200 percent or more, expressed on an O.D. basis, as noted above. All such moisture must be taken into account when calculating the concentration of the nitric acid present in the lignocellulosic feed no matter how said acid is supplied. In some cases, it may be desirable to subject the lignocellulosic raw material to a drying step to bring the moisture content into a 2 to 50 percent range in order to facilitate the incorporation into the material of nitric acid having a relatively high concentration. For example, a drying step of this character can be practiced to good advantage when using gaseous oxides of nitrogen as the nitric acid source. In some few cases, and especially when dealing with previously desiccated lignocellulosic feed stocks, a certain amount of moisture can be introduced into the material prior to the addition of the nitric acid, again to facilitate control of the concentration of the acid on the material to be oxidized.

The nitric acid to be employed in oxidizing the lignocellulosic material can be added to or formed within the particulate feed materials under subatmospheric, atmospheric or superatmospheric pressures. However, to simplify the lignocellulosic oxidation step it is preferable to bring the nitric acid or nitric acid-forming materials into contact with the lignocellulosic particles as the same are maintained under a partial vacuum. For example, this can be the vapor pressure of the system at ambient temperatures and at typical initial pressures ranging from about 5 to 30 mm Hg. Pressures may be raised above this level, if desired, by preliminary introduction of oxygen. Thereafter, during the period in which the aqueous solution of nitric acid or the nitric acid-forming gases are being taken up by the lignocellulosic particles, the pressure increase is only moderate. Following the take-up of the nitric acid by the particles, the system begins to evolve gases, and the latter are preferably allowed to build up so as to maintain system pressures of from about 0.5 to 10 atmospheres (guage) during the balance of the oxidation reaction step, as temperatures are increased in the manner discussed below. Pressures within this range may also be regulated by the addition of any required oxygen or gaseous oxides of nitrogen.

Temperatures between about 0° and 100°C. are employed during the oxidation step when using $HNO_3$ as the oxidizing agent. When lignocellulosic materials are treated with this agent at temperatures in the lower portion of this range, e.g., at ambient temperatures, a rise in temperature occurs which is accompanied by evolution of gas. When this initial reaction has subsided, the temperatures of the system are gradually increased to temperatures above about 60°C., and preferably above about 75°C., to effect a final reaction, the temperatures being maintained at said levels until evolution of gas has virtually ceased. This condition is indicative of the termination of the oxidation reaction. It will be observed that the color of the oxidized lignocellulosic material normally takes on a light yellow appearance as the oxidation reaction nears completion.

The gross amount of oxidation effected with respect to the lignocellulosic material will vary with the overall amount and concentration of the nitric acid employed, the amount and partial pressure of any oxygen gas which is used, and the temperature and time of the oxidation reaction. Variables of lesser importance are the total pressure maintained within the oxidation zone as oxidation proceeds and the nature of the particular lignocellulosic material being used as the feed. The process of the present invention is achieved when, by suitably regulating these various operating conditions, the lignocellulosic material consumes from about 2.5 to 50 weight percent $HNO_3$, or the equivalent amount of oxygen (1.25 to 25 weight percent), on an O.D. lignocellulosic basis. As here indicated, each weight percent of $HNO_3$ consumed in oxidizing the lignocellulosic material provides about 0.5 weight percent oxygen assuming that the nitric acid reduction product is $N_2O$. This value is somewhat higher when $N_2$ is the reduction product, and lower when the product is NO. However, 0.5 weight percent is a good working value. While NO is oxidizable by $O_2$ present in the system, this is not true of the species $N_2O$ and $N_2$. Accordingly, when using nitric acid along with oxygen as the oxidant material, the progress of the reaction can be followed by monitoring the reaction system to determine the amounts of said $N_2O$ and $N_2$ species which have been produced. This gives an indication as to the existing and potential oxidation within the system. Oxygen levels within the system can also be monitored, thus permitting a calculation to be made as to the amount of $HNO_3$ which has been formed within the system as the reaction progresses.

The oxidation conditions are preferably such that the acid concentration drops to a level below about 1.5 to 2 percent $HNO_3$ as the desired amount of oxidation has been achieved, this end point being reached within a reasonable reaction period ranging from several minutes to one or more hours, for example. This method is most economic inasmuch as acid of this low concentration is essentially exhausted.

As indicated above, a primary purpose of the oxidation step is to provide the lignocellulosic molecule with carboxyl groups. There is also some formation of carbonyl groups and this is also advantageous. However, inasmuch as carboxyl group formation is predominant, reference is frequently made hereinafter only to said groups.

B. OXIDATION WITH $O_2$

In another embodiment of this invention the particulate lignocellulosic material is subjected to the action of molecular oxygen in a reaction vessel. The particulate material may be used as it is prepared from any of the materials listed above subsequent to adjustment of its moisture content to a value in the range of about 20 to 300 weight percent. The material may be further treated, before or subsequent to adjustment of its moisture content, with a salt such as calcium carbonate, magnesium carbonate, sodium carbonate or sodium bicarbonate, or with a base such as calcium oxide, calcium hydroxide, magnesium oxide or sodium hydroxide. The salt or base so employed will adjust and buffer the system so that the concentration of the hydrogen ion may be varied from strongly acidic to strongly basic. This controls the type of degradation product formed during the oxidation as well as the properties of the resulting oxidized material prior to addition of any substance that will function as a cross-linking agent or as an agent to bring about a specific reaction.

In carrying out the oxidation reactiion, the reaction vessel containing the lignocellulosic material is charged with an atmosphere of oxygen or a gas in which the partial pressure of oxygen may range from about 0.2 to 20 atmospheres. The temperature of the vessel is thereafter controlled in a range between about 80° and 150°C. for a period of about 0.25 to 3 hours. The total pressure in the reaction vessel is controlled in a range between about 1 to 30 atmospheres depending upon temperature and whether air, oxygen or oxygen-enriched air is used.

Monitoring the oxygen content of the gases within the reaction vessel as the reaction progresses will permit one to determine when the desired amount of oxygen (within a range of from about 1.25 to 25 weight percent, based on the weight of the O.D. lignocellulosic material), has been consumed.

Following the oxidation procedures outlined above, modifications in the structure of the oxidized lignocellulosic molecules can be made involving one or more of the various classes of functional groups present, including carboxyl, carbonyl, both alcoholic and phenolic hydroxy groups and ethylenic double bonds. In one such modification, the carboxyl groups present are converted to ammonium salts by treatment of the oxidized lignocellulosic material with ammonium hydroxide. This treatment, which proceeds readily at ambient temperatures, has the advantage that it exerts a softening or plasticizing action on oxidized wood particles of a heavy character (for example, wood chips) which would otherwise be difficult to conform during the ensuing molding step. The ammonium salt groups can then be converted to the corresponding carbamyl groups by heating the salt at temperatures of from about 150° to 200°C., while driving off the water formed during this reaction period.

Cross-linkages of the ester type can be provided not only by inducing reaction (during molding) between hydroxyl and carboxyl groups present in the oxidized lignocellulosic material, but also by treating said material with polybasic acids such as succinic, maleic or terephthalic acids, or their anhydrides, these acids reacting, for example, with residual hydroxyl groups present in the material, when added in amounts of from about 0.5 to 15 weight percent. Cross-linkages of the polyamide type can be formed by adding to the oxidized lignocellulosic material about 0.5 to 15 percent by weight of an aliphatic or aromatic polyamine such as ethylenediamine, 1,2-propanediamine, trimethylenediamine, hexamethylenediamine, decamethylenediamine, o-, m- and p-phenylene-diamine or any one of the various diaminotoluenes, for example. These percentages are calculated on an O.D. lignocellulosic basis. Appropriate esterification or amidation catalysts may also be added. The following cross-linking reactions are typically those which may occur in the mold in the presence of the added polyamine:

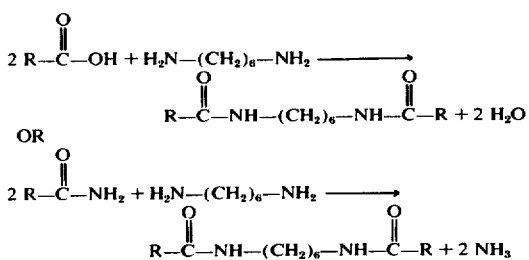

wherein R represents the lignocellulosic moiety of the oxidized compound. Said reactions of polyamide formation can be induced to take place readily as the material impregnated with the polyamine is molded into shape in the press at temperatures of 100° to 260°C., provided the mold is allowed to breath and thus permit escape of the H₂O or NH₃ reaction products.

In another modification, carbamyl groups present in the lignocellulosic material can be reacted during the pressing step with alkylene oxides such as ethylene oxide or propylene oxide, for example, which have previously been added to the said material in amounts of from about 0.5 to 15 percent by weight. The following is a typical reaction:

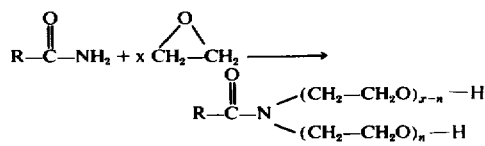

wherein R has the meaning given above and wherein $x$ and $n$ represent whole integers, $x$ usually having a value between about 4 and 20 and $n$ usually having a value of about one half that of $x$. The terminal hydroxy groups in the nitrogen-attached, hydroxypolyoxyalkyl groups can then be reacted with residual carboxyl groups in the lignocellulosic molecule (or those added thereto by way of polybasic acids, for example) to form cross-linkages of the ester type.

After the oxidation reaction is complete, and any desired chemical additives have been supplied to the oxidized product, the latter material may be worked up in any one of several alternative fashions preparatory to being given the desired shape by molding in a press. In one such method the oxidized lignocellulosic material is subjected to dry or wet formation of a mat or web, followed by simultaneous pressing and heating to densify and conform the product, and finally to drive off residual water and water of condensation as the temperature is adjusted to the point that functional groups present will react to form molecular cross-linkages such, for example, as those of the ester or amide type. Relief of steam by allowing the press to breath will drive such reactions toward completion. These reactions normally go forward at temperatures in a range of about 100° to 260°C. with the lowest temperature being selected that will give desired tensile and dimensional stability properties within an acceptable molding time. Such time typically is about of the order of 5 to 30 minutes, though longer or even shorter periods can be employed. Heating in the press is continued until the moisture content of the final molded product is reduced to a level below about 10 percent and preferably below 5 percent by weight, this being a characteristic feature of the present invention no matter what the nature of the cross-linking reaction taking place in the press. Pressures during the molding step are maintained at a level above 100 psig and preferably range from 150 to 600 psig, though pressures of 1500 psig or even higher can be employed. The pressures chosen are normally such as to effect the desired densification and forming of the lignocellulosic mass.

The foregoing molding operations may all be carried out in a single piece of apparatus such as an enclosed caul press, for example, or the operation may be broken up into discrete processing steps, each with its own apparatus. Thus, in one mode of operation, the wet lignocellulosic material can first be given a preliminary shaping operation, with the resulting mat then being placed within the press for forming the ultimate shape of the desired density. The pressed article may be post-heat treated, if desired, to complete the cross-linking reaction.

The invention will be more clearly understood by reference to the figures of the appended drawings in which various of the valves, compressors, pumps, heaters and instruments for controlling temperature, pressure and the like have been omitted, the nature and arrangement thereof being obvious to the skilled in the art in the light of the present description.

Figure 2:
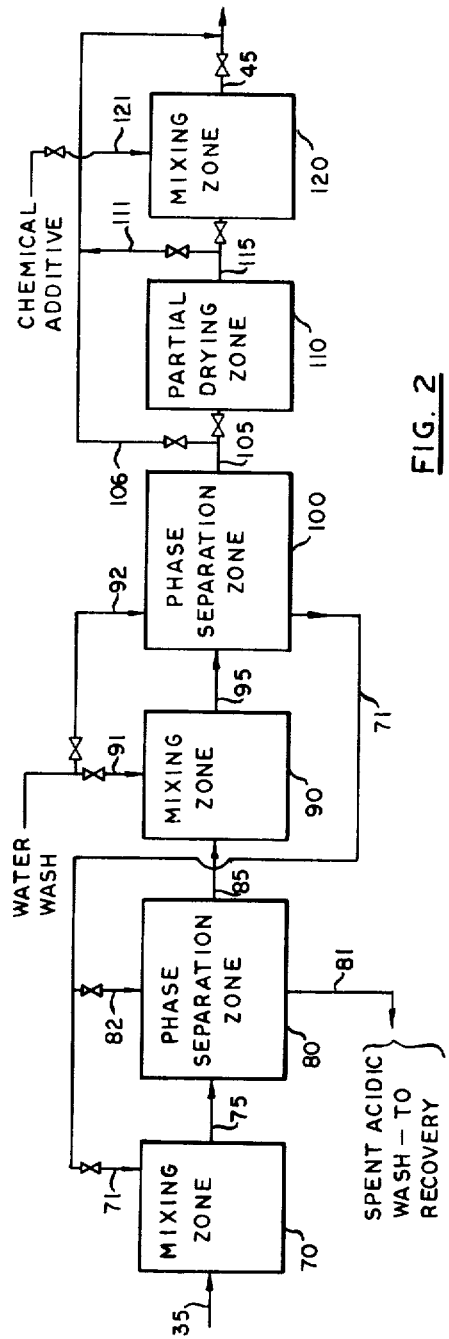
Figure 3:
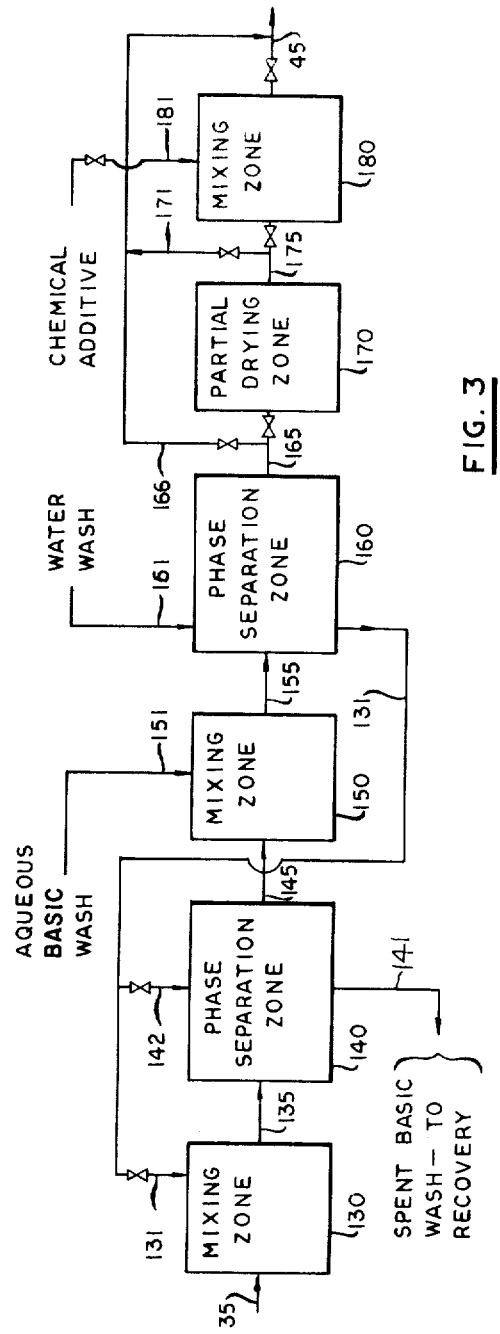

IN THE DRAWINGS:

FIG. 1 is a schematic flow diagram of an operation embodying the present invention whereby lignocellulosic particles are treated with $O_2$ and/or $HNO_3$ and whereby the resulting oxidized lignocellulosic product, following a degassing and moisture control step and one or more optional chemical addition steps, is formed into a mat and then molded into the desired shape in a press;

FIG. 2 shows a modified embodiment of the invention, as presented in FIG. 1, wherein the oxidized lignocellulosic product is washed counter-currently with water and then, after optional drying and chemical addition steps, is formed into a mat and then molded; and FIG. 3 is another modified embodiment of the invention as illustrated in FIG. 1 wherein the oxidized lignocellulosic product is washed counter-currently with ammonium hydroxide or other soluble base, and then with water, following which the resulting neutralized product, after optional drying and chemical addition steps, is formed into a mat and then molded.

Referring more particularly to FIG. 1, a particulate lignocellulosic feed is passed through conduit 5 into a reactant addition zone 10. In this zone the desired amount of $HNO_3$ or of $O_2$ can be added to the feed material under ambient pressure conditions or under subatmospheric pressures as the zone is evacuated through line 11. Shown at 15 is a manifold line adapted to receive one or more of a variety of gaseous or liquid treating materials and to discharge the same into zone 10. Thus, aqueous nitric acid can be supplied to line 15 through line 12, while gaseous $NO_2$, $NO$, air or $O_2$ are supplied through lines 13, 14, 16 and 17, respectively. In treating the lignocellulosic material in zone 10 under reduced pressures, the desired evacuation through line 11 is established, after which this line is closed off and the gases or liquid $HNO_3$ in the manifold are then allowed to flow into zone 10. The latter is thereby brought to atmospheric or superatmospheric pressures, if desired.

When using oxygen as the oxidant it may be desirable to first treat the lignocellulosic material with a salt or base added through conduit 6.

After the desired amount of oxidant material has been discharged into zone 10, the manifold line 15 is shut off, and any excess gases present in said zone not taken up by the lignocellulose, or which are formed therein, may be discharged through line 18 into an exhaust manifold line 19 for passage to a gas recovery zone 20.

From zone 10, the treated lignocellulosic material is passed through conduit 25 into oxidation zone 30 which is adapted to be regulated in temperature and pressure by appropriate means, not shown. Provision is made to supply additional oxidant through line 31 to zone 30, if desired, to enhance the oxidant effect in said zone as the oxidation of the lignocellulose progresses. Gases present in zone 30 can be removed when oxidation is complete, or at any earlier stage, by opening line 32 which allows the gases to pass through line 19 into gas recovery zone 20.

After the desired oxidation has taken place in zone 30, the oxidized lignocellulose material is conveyed through conduit 35 into a degassing zone 40 where the product is swept by air or other appropriate gas as admitted through line 41 to remove reactant gases and optionally any desired amount of water, the gases in line 41 being heated when they are to perform a significant drying function. Effluent gases from zone 40 may be taken to recovery zone 20 via lines 42 and 19.

The lignocellulosic material is conveyed from zone 40 through conduit 45 into a mat-forming zone 50. Said material can optionally be uniformily treated with one or more added chemicals as supplied through line 51, before reaching the mat-forming zone. In the latter zone, the lignocellulosic material to be subsequently molded is distributed over platens (not shown) for carriage thereon, as indicated by broken line 55, to an enclosed press 60 which can be of the caul or other type.

In press 60 the oxidized lignocellulose material is formed into the desired shape under elevated conditions of temperature and pressure as generated by conventional means (not shown). Provision is made to collect the moisture vapor and the other gases evolved from the lignocellulosic material as the pressing step is carried out. All these gases may be carried by lines 61 and 19 to the gas recovery zone 20.

In the embodiment of the invention shown in FIG. 2, the oxidized lignocellulosic material being conveyed through conduit 35 in FIG. 1 is subjected to a modified treatment before being reintroduced, at conduit 45, into the processing sequence of FIG. 1. Thus, the material in conduit 35 is subjected to counter-current washing as it is passed sequentially through a mixing zone 70, a phase separation zone 80, a second mixing zone 90 and a second phase separation zone 100. More particularly, in zone 70 the acidic, oxidized lignocellulosic material is mixed with the aqueous phase, as supplied through line 71, which is removed from the second phase separation zone 100. The slurry from zone 70 is then carried through conduit 75 into phase separation zone 80 from which there is recovered a spent acidic wash stream, rich in dissolved solids, which is taken off through line 81. A portion of the wash stream in line 71 can be supplied to zone 80, if desired, through line 81 to enhance the efficiency of the separation taking place in said zone.

The solid phase separated in zone 80 is carried through conduit 85 into the second mixing zone 90 where said solid phase is mixed with incoming fresh water in line 91. The slurry from zone 90 is carried through conduit 95 into the second phase separation zone 100 from which the aqueous phase is withdrawn through line 71, as noted above. Fresh water, supplied through line 92, can be used to further wash the dewatered solid phase as the same is separated in zone 100.

The separated solid phase from zone 100 is taken through conduit 105 and can, if desired, be returned directly to conduit 45 via conduit 106. Alternatively, said solid phase can be given a partial drying treatment in zone 110 and then be returned to conduit 45 via conduits 111 and 106. In still another embodiment, the partially dried solid phase is carried through conduit 115 into mixing zone 120 for admixture therein with chemicals added via line 121 before being returned to conduit 45 for subsequent mat forming and pressing.

The modified embodiment of the invention illustrated in FIG. 3 is much the same as that of FIG. 2 except that here the oxidized lignocellulosic material is both neutralized with ammonium hydroxide or other water-soluble base, as well as water-washed in countercurrent operations. More particularly, the acidic lignocellulosic material in conduit 35 is passed to a mixing zone 130 where the material is mixed with the dilute aqueous basic phase (as supplied through line 131) which is recovered from a second, downstream, phase separation zone 160. The slurry from zone 130 is then carried through a conduit 135 into a phase separation zone 140 from which there is recovered a spent, basic wash stream, rich in dissolved solids, which is taken off through line 141. A portion of the wash stream in line 131 can be supplied to zone 140, if desired, through line 142 to enhance the efficiency of the separation taking place therein.

The solid phase separated in zone 140 is carried through conduit 145 into a second mixing zone 150 where said solid phase is fully neutralized by admixture with an incoming basic wash in line 151. The slurry from zone 150 is carried through conduit 155 into the second phase separation zone 160, from which dilute basic wash stream is taken off in line 131, as noted above. Fresh water, supplied through line 161, serves to wash residual base from the solid phase which is separated in zone 160.

The washed, solid phase from zone 160 is taken through conduit 165 and can, if desired, be returned directly to conduit 45 via conduit 166. Alternatively, said solid phase can be given a partial drying treatment in zone 170 and then be returned to conduit 45 via conduits 171 and 166. In still another embodiment, the partially dried solid phase is carried through conduit 175 into mixing zone 180 for admixture therein with chemicals added via line 181 before being returned to conduit 45 for subsequent matforming and pressing.

The following examples are illustrative of the invention but are not to be construed as limiting.

EXAMPLE 1

This operation is conducted in a batch fashion using 330 g of white fir particulate fragments as formed by the hammer-milling of conventional ⅝ inch pulp chips. The resulting material, which has a moisture content of 30 g and is of a size to pass through a ¼ inch mesh screen and to be retained on a ⅛ inch mesh screen, is placed in a round bottom flask, and during the entire operation described herein the flask is tilted to one side and rotated in a water bath controlled at about 20°C. The flask is first evacuated and following this the vacuum line is turned off and 279 g of an aqueous $HNO_3$ solution containing 90 g $HNO_3$ are slowly added to the evacuated, turning flask which is maintained in cold water. This represents the addition of 30 percent by weight $HNO_3$, based on the O.D. wood. The acid solution is allowed to mix with the wood particles for approximately 1 hour, and during this time the temperature of the acid-containing wood feed rises to approximately 50° C. should the flask not be cooled with water. The rotating flask is now rapidly heated by the water bath whereby the temperature of the material in the flask is increased, over a period of approximately 20 minutes, to a level of about 85°C. At 68° to 72°C. there is observed a yellowing of the particulate wood pieces along with a substantial increase in the volume of formed gaseous oxidation products. The temperature of the contents of the flask is held at about 85°C. for 1 hour. During this heating period the vigorous evolution of gas is observed to virtually cease. The oxidation phase of the process is then deemed to be substantially complete, with the $HNO_3$ present nearing exhaustion. From the contents of the flask, which now have a total weight of 545 g, there is separated out a 109 g fraction which is then combined with 10 percent (O.D. wood basis) of 1,4-hexamethylenediamine. The resulting mixture is then dried to a moisture content of about 23 weight percent, following which the partially dried material is placed in a mold frame supported on an underlying caul. It is there given a prepressing step to compact the material within the frame, the pressures so applied being of the order of 50 psi. The frame is then removed, leaving the lignocellulosic mat upon the caul. A top caul is then placed over the mat and the resulting assembly is subjected to a pressingheating cycle in a single opening platen press. Press temperatures are initially about 130°C. and are increased to about 180°C. over a pressing time of about 15 minutes during which the pressure is maintained at about 175 psi. The press is then opened and there is recovered a 0.34 inch thick particle board having a density of 0.88. Said board has a moisture content of about 2 weight percent and an internal bond of about 176 psi. Moisture absorption during a 1 hour boil test is approximately 37 weight percent, with a resultant increase in thickness of 15.7 percent. The board has a linear expansion of 0.116 percent and an increase in thickness of 11.8 percent when allowed to stand submerged in water for 7 days.

EXAMPLE 2

The operation of Example 1 is repeated, but with the oxidized lignocellulosic material being treated with 10 percent maleic anhydride, 0.5 percent benzoyl peroxide and 4 percent ammonium chloride (all on the basis of the O.D. weight of the lignocellulosic material), rather than with 1,4-hexamethylenediamine. The resulting mixture is dried to a moisture level of 2 percent using a stream of warm air at about 50 inches C., following which the dried material is pressed in a single opening platen press under the same conditions as recited above in Example 1. There is recovered a particle board having good strength and other requisite physical properties, including dimensional stability.

EXAMPLE 3

In this operation 726 g of white fir flakes containing 126 g of water are placed in a flask which is rotated in a bath of water maintained at about 20°C. as NO and $O_2$ are simultaneously admitted, the flask having first been evacuated. During this 2 hour period NO is admitted in an amount equal to 12 percent of the weight of the lignocellulosic material, as calculated on an O.D. basis, the $O_2$ in the gaseous mixture being present in 33 percent excess over the amount theoretically required to convert all the NO to $HNO_3$. At the conclusion of adding the NO and $O_2$ gases, the temperature of the flask is increased to 75°C. over a 1 hour period. The contents of the flask are then held at 75°C. for 30 minutes, thereby driving the reaction substantially to completion, leaving little unreacted NO. The resulting oxidized material is withdrawn from the flask and sprayed, while being tumbled, with 10 weight percent of 1,4-hexamethylenediamine (on an O.D. lignocellulosic basis), said chemical being applied in the form of a 40 percent aqueous solution. The moisture content of the treated material is now reduced to 9.6 percent, using air at a temperature of about 50° to 60°C., following which the resulting, partially dried material is placed in a press and processed under the same condition as recited above in Example 1. On opening the press there is recovered a 0.346 inch thick particle board having a density of 0.80, a moisture content of 1.5 percent, an internal bond of 123 psi, a modulus of rupture of 3,657 psi and a modulus of elasticity of 1,005,200 psi. In a 1 hour boil test the water absorption is 45.0 percent and the resulting increase in thickness is 17.1 percent. On being immersed in water for 7 days it is found that the board has a linear expansion of 0.160 percent and an increase in thickness of 5.1 percent.

EXAMPLE 4

3,000 g of white fir flakes containing 1,500 g of water are placed in a 1.5 cu. ft. jacketed autoclave at 100°C. The autoclave is then evacuated and oxygen is added until there is developed an oxygen partial pressure of 135 psi within the atuoclave. The temperature of the autoclave contents is then raised to 125°C. over a period of 15 minutes and is held at said level for 1 hour. During this 1 hour period, additional oxygen is supplied to the vessel in an amount of approximately 5 percent, based on the O.D. weight of the lignocellulosic material, the total weight of oxygen supplied during this and the initial steps being 320 g. Oxygen consumption during this run is calculated to be 20 weight percent of the O.D. weight of the lignocellulosic material. The material is now withdrawn from the autoclave, it having a moisture content of 43 weight percent, and to it is then added 15 percent of maleic anhydride and 2 percent benzoyl peroxide, said percentages being expressed on the O.D. weight of the oxidized lignocellulosic material. The resulting material is then dried to a 2 percent moisture level using air at about 50° to 60°C., following which the dried material is pressued under the conditions recited above in Example 1. There is thus obtained a particle board having good strength and dimensional stability.

I claim:

1. A method of preparing an oxidized, particulate, lignocellulosic product which can be molded between plates in a press at elevated temperatures above about 100°C and elevated pressures above about 100 psig into a shaped article having good strength and dimensional stability, which comprises oxidizing the particulate, lignocellulosic material at an elevated temperature above about 0°C with at least one of nitric acid and oxygen gas in an amount and under conditions whereby said lignocellulosic material consumes from about 1.25 to 25 weight percent of oxygen, based on the dry weight of the particulate lignocellulosic material, and terminating such oxidation after evolution of gas has substantially ceased, followed by molding the oxidized lignocellulosic material between plates in a press under said elevated pressure and temperature above 100°C to effect cross-linking within the materials and densify the same and to reduce the moisture content in the molded product to below about 10 percent.

2. The moldable lignocellulosic material obtained by the method of claim 1.

3. The molded lignocellulosic product obtained by the method of claim 1.

4. The method of claim 3 wherein the oxidized lignocellulosic material is treated with from about 0.5 to 15 weight percent, based on the dry weight of said material, of a chemical non-degrading to said material and which is effective to provide molecular cross-linkages as the treated material is subjected to the step of being molded in a press.

5. The molded lignocellulosic product obtained by the method of claim 4.

6. The method of claim 4 wherein the oxidation of the particulate, lignocellulosic material is effected with nitric acid at temperatures ranging from about 0° to 100°C.

7. The method of claim 4 wherein the oxidation of the particulate, lignocellulosic material is effected by oxygen gas at temperatures ranging from about 80° to 150°C.

8. The method of claim 4 wherein the oxidation of the particulate, lignocellulosic material is effected with a mixture of nitric acid and oxygen gas at temperatures ranging from about 0° to 100°C.

9. The method of claim 8 wherein the nitric acid employed to oxidize the particulate, lignocellulosic material is formed in situ on said material by the reaction of nitric oxide with oxygen and water.

10. A method of preparing an oxidized, particulate, lignocellulosic product which can be molded between plates in a press at elevated temperatures and pressures into a shaped article having good strength and dimensional stability, which comprises oxidizing the particulate lignocellulosic material with nitric acid at a temperature ranging from about 0° to 100°C. until there has been a net consumption of from about 2.5 to 30 percent nitric acid based on the oven dry weight of the lignocellulosic material, said oxidation being conducted by first treating the product at substantially ambient temperature with said nitric acid to impregnate the material with the acid and effect an initial reaction accompanied by evolution of gas, then gradually increasing the temperature to above about 75°C. to effect a final reaction, and terminating the reaction after cessation of gas evolution.

11. The moldable lignocellulosic product obtained by the method of claim 10.

12. The method of claim 10 wherein the nitric acid employed to oxidize the particulate, lignocellulosic material is formed in situ on said material by the reaction of nitric oxide with oxygen and water.

13. The method of making a molded, densified lignocellulosic product having good strength and dimensional stability which comprises oxidizing particulate lignocellulosic material with an oxidizing agent comprising at least one of nitric acid and oxygen gas at a temperature above 0°C in an amount and conditions until there has been a net consumption of from about 1.25 to 25.0 weight percent of oxygen based on the oven dry weight of said lignocellulosic material, said oxidation being conducted by first treating the lignocellulosic material at substantially ambient temperature with said oxidizing agent to impregnate the material therewith and to effect an initial reaction which is accompanied by evolution of gas, gradually increasing the temperature to above about 60°C to effect final reaction by which carboxyl groups are formed on the lignocellulosic molecule, terminating the reaction after gas evolution has substantially ceased to thus form an oxidized moldable product, molding said product between plates in a press at an elevated temperature of above about 100°C and at an elevated pressure of above about 100 psig to effect cross linking within the material being pressed and to densify the same, and maintaining said pressing to reduce the moisture content in the pressed product to below about 10 percent.

14. The method of claim 13 wherein the moisture content is reduced below about 5 percent.

15. The molded lignocellulosic product obtained by the method of claim 13.

16. The method of claim 13 wherein the oxidized lignocellulosic material is treated with from about 0.5 to 15 weight percent, based on the dry weight of said material, of a chemical non-degrading to said material and which is effective to provide molecular cross-linkages as the treated material is subjected to the step of being molded in the press.

17. The molded lignocellulosic product obtained by the method of claim 16.